May 19, 1925.
W. E. HARRIS
1,538,805
RAILROAD BED MOWING MACHINE
Filed Dec. 28, 1922
2 Sheets-Sheet 1
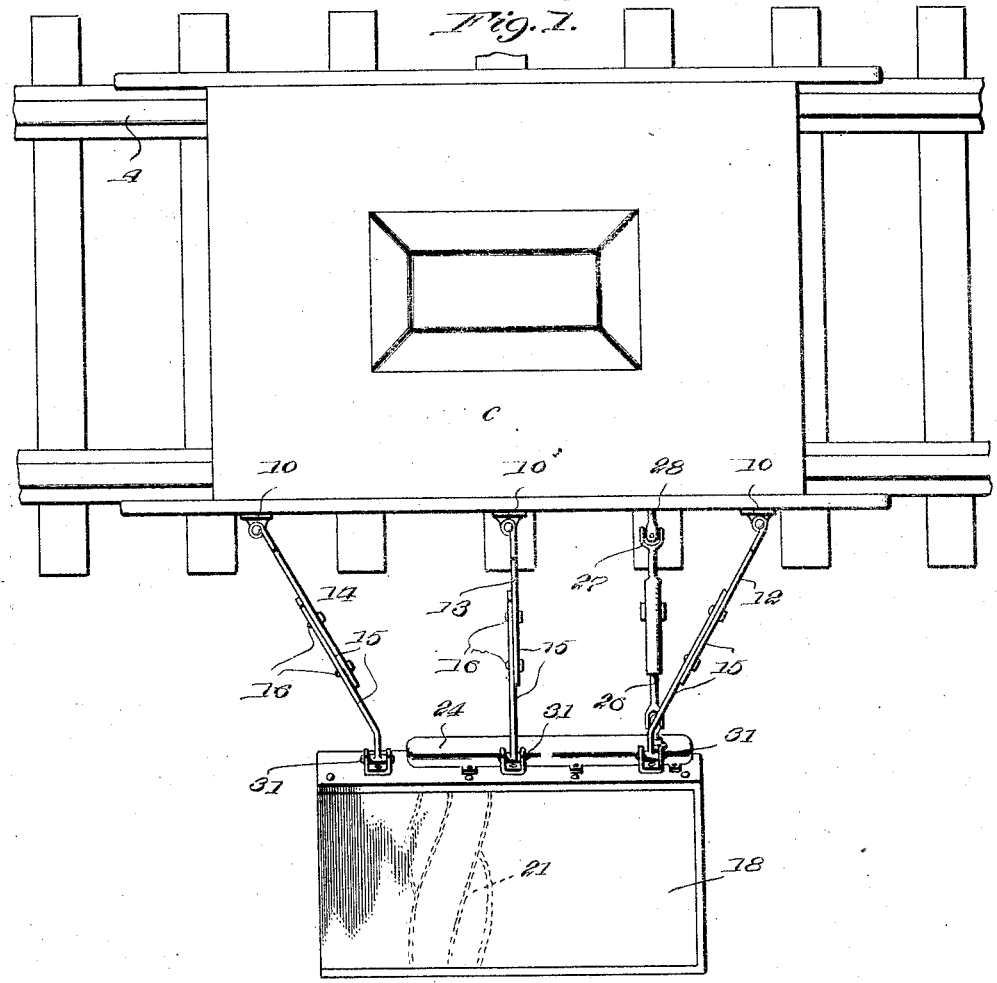

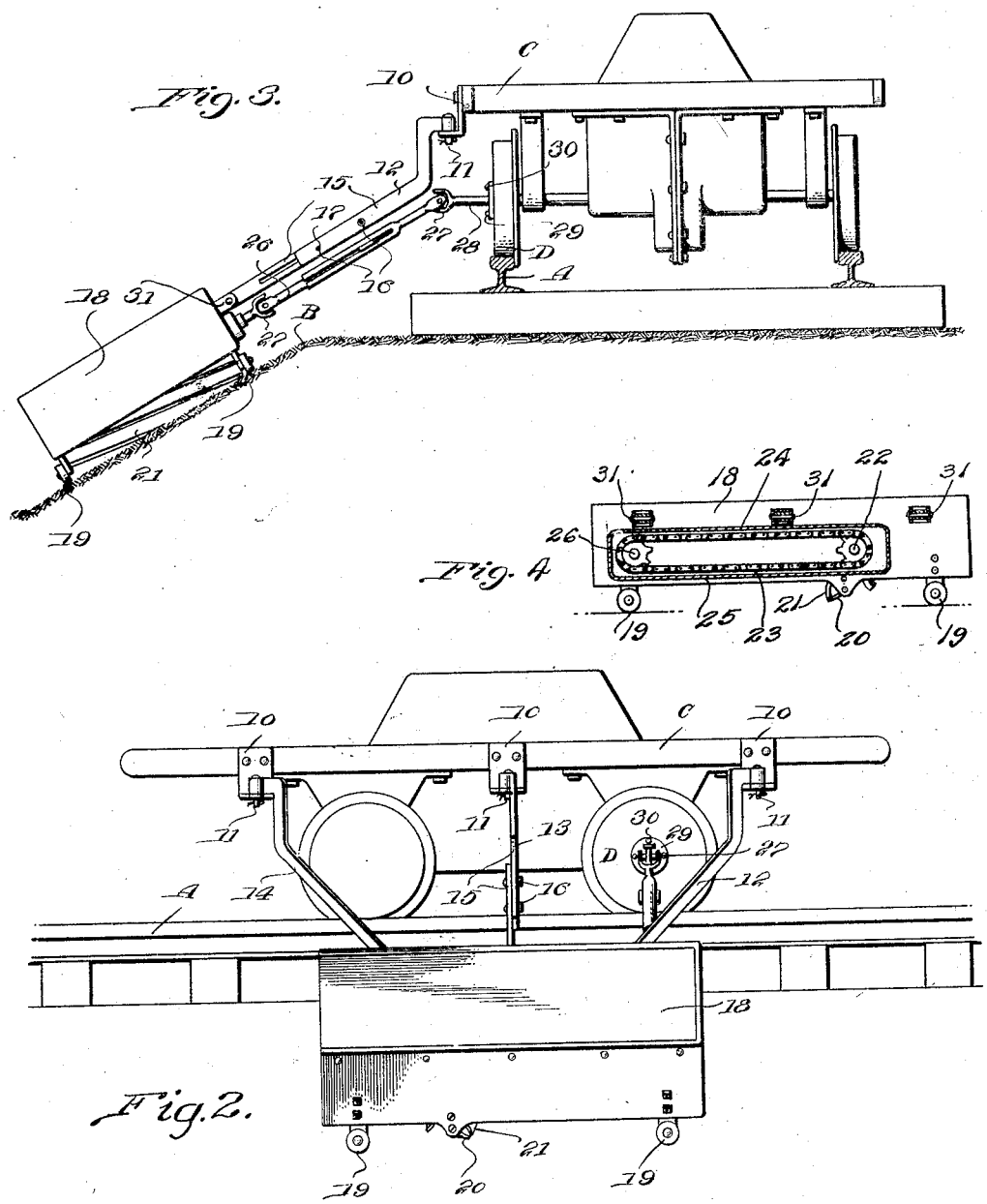

Patented May 19, 1925.

1,538,805

UNITED STATES PATENT OFFICE.

WILLIAM E. HARRIS, OF LONGVIEW, TEXAS.

RAILROAD-BED-MOWING MACHINE.

Application filed December 28, 1922. Serial No. 609,529.

*To all whom it may concern:*

Be it known that I, WILLIAM E. HARRIS, a citizen of the United States, residing at Longview, in the county of Gregg and State of Texas, have invented new and useful Improvements in Railroad-Bed-Mowing Machines, of which the following is a specification.

This invention relates to devices for use in treating or working railroad road beds and has for its object the provision of a novel device designed to be attached to a hand, motor or push car traveling along the tracks and including selectively usable implements for mowing the grass, weeds and the like, scraping and harrowing the road bed at the sides of the track for giving it the proper grade and smoothing it off into proper condition.

An important object is the provision of a device of this character which includes a plurality of adjustable arms detachably and pivotally connected and carried by a hand car or the like, the arms being fully adjustable whereby to vary the angular inclination of a scraper or blade carried thereby.

An additional object is the provision of a device of this character which will be comparatively simple and inexpensive in manufacture, easy to install and use, efficient and durable in service and a general improvement in the art.

With the above and other objects and advantages in view the invention consists in the details of construction to be hereinafter more fully described and claimed and illustrated in the accompanying drawings, in which:

Figure 1 is a plan view of the device including a mower and showing it mounted upon a hand car, Figure 2 is a side elevation, Figure 3 is an end elevation, Figure 4 is a detail section taken through the mower.

Referring more particularly to the drawings the letter A designates a railroad track, B designates the road bed at the sides thereof and C represents a vehicle which might be a hand car, motor car or push car.

In carrying out my invention I provide upon each side of the car C a plurality of socket-like brackets 10 within which are detachably and pivotally engaged downturned trunnions 11 formed on arms 12, 13 and 14 which all extend laterally from the same side of the car. In the form of the device shown in Figure 1 each of these arms consists of a pair of bars 15 slidably adjustably connected as for instance by means of bolts 16 passing through selected registering holes 17.

Carried by the outer ends of the arms is a mower structure including a frame 18 mounted upon wheels or rollers 19, provided at its forward end with a species of guide or shoe 20, and having journaled in its rear portion a mower blade 21 of the rotary type and of any ordinary or preferred construction.

It is of course necessary to provide some means for driving this mower blade and while it might be constructed similar to the ordinary or well known type of domestic lawn mower, it is preferable to provide a drive mechanism which might consist of a sprocket 22 secured with respect to the blade 21 and having trained thereover a chain 23 traveling within a housing 24 and trained about a sprocket 25 mounted upon a shaft 26 journaled transversely of the forward end of the frame. Connected with this shaft by a universal joint 27 is a drive shaft 28 which is provided at one end with an enlarged portion 29 carrying clamping bolts 30 by means of which it may be engaged upon the hub of one wheel D of the carrying vehicle.

When use of the device is desired, the arms 12, 13 and 14 are engaged with the brackets 10 and the sections of the arms are adjusted so that the forward arm 12 will be inclined rearwardly, the middle arm 13 will extend outwardly from the track car at right angles thereto and the arm 14 will be inclined forwardly. It is of course evident that all of the arms are inclined downwardly and outwardly and it is to be observed that all the arms have a pivotal connection 31 with the frame 18 of the mower so that as the car is pushed, pulled or otherwise propelled along the track the mower may accommodate itself to inequalities in the ground traveled over. As the wheels of the operating car turn, the shaft 28 connected with one thereof will drive the mower mechanism, so that all grass, weeds and the like growing along the road bed will be cut.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A road bed mowing device for attachment to a track vehicle, comprising brackets on the track vehicle, longitudinally adjustable arms pivoted on said brackets, and a mower carried by said arms and pivotally mounted with respect thereto whereby to be capable of vertical swinging movement to correspond with and accommodate inequalities in the surface traveled over, the mower including a frame, rollers journaled therebelow, a rotary cutter journaled in the frame and a flexible drive shaft operatively connected with an axle of the track vehicle and connected with said rotary cutter.

2. A road bed mowing device for attachment to a track vehicle, comprising brackets on the track vehicle, longitudinally adjustable arms pivoted on said brackets, and a mower carried by said arms and pivotally mounted with respect thereto whereby to be capable of vertical swinging movement to correspond with and accommodate inequalities in the surface traveled over, the mower including an elongated frame, rollers journaled therebelow, a rotary cutter journaled in the frame and having a shaft carrying a sprocket, a short shaft journaled in the frame and carrying a sprocket, a chain trained about both sprockets, a housing carried by the frame and enclosing the sprockets and chain, and a universal jointed shaft operatively connected with a rotary element of the track vehicle and connected with said short shaft.

3. A device for mowing the grass along railroad track way, comprising the combination of a wheeled track vehicle, a pair of outer angular brackets and an intermediate bracket secured upon one side of the vehicle, a pair of outwardly converging arms pivotally connected with the outer brackets, a third arm pivotally connected with the intermediate bracket and extending outwardly at right angles to the side of the track vehicle, a frame, a mowing mechanism mounted within the frame, a plurality of brackets on the side of the frame toward the track vehicle, the outer ends of said arms being pivotally mounted within said last named brackets, a drive connection for the mowing mechanism including a telescopic shaft having a universal connection with the mowing mechanism and with one axle of the track vehicle, all of said arms being formed of longitudinally adjustably connected sections whereby the distance of the mowing mechanism from the side of the track may be varied, the pivotal connection of the mowing mechanism frame with the supporting arms permitting the mowing mechanism to follow inequalities in the ground travelled over.

In testimony whereof I affix my signature.

WILLIAM E. HARRIS.